May 30, 1950  N. A. CHRISTENSEN  2,509,671
SLIDE VALVE
Filed Feb. 1, 1946
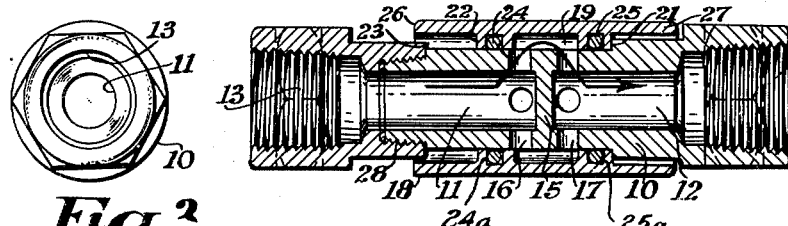
Fig. 3  Fig. 1
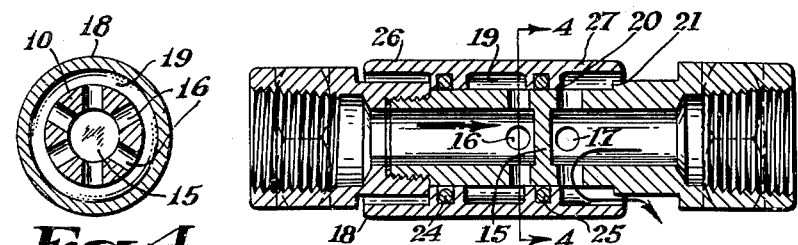
Fig. 4  Fig. 2
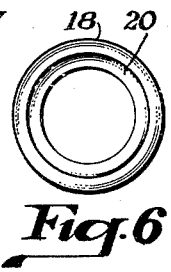 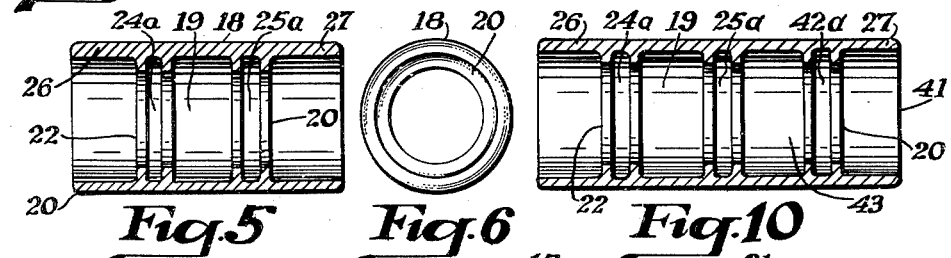 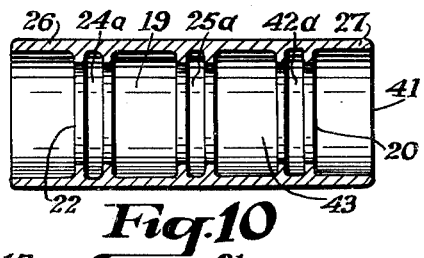
Fig. 5  Fig. 6  Fig. 10
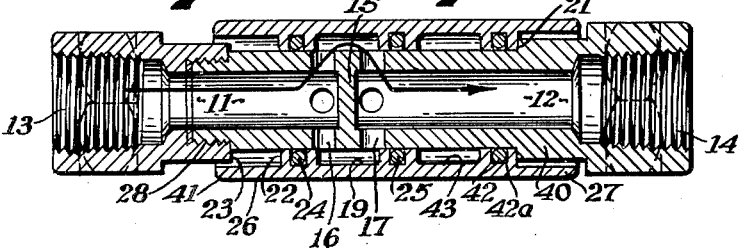
Fig. 7
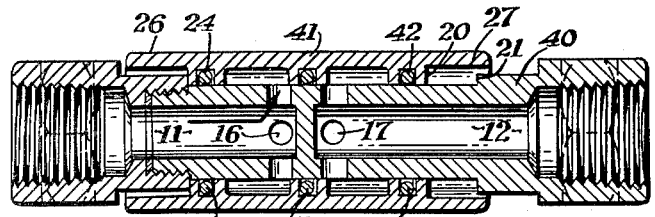
Fig. 8
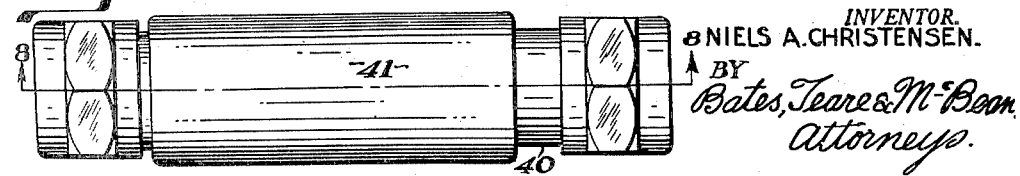
Fig. 9
INVENTOR.
NIELS A. CHRISTENSEN.
BY Bates, Teare & McBean
Attorneys.

Patented May 30, 1950

2,509,671

UNITED STATES PATENT OFFICE 2,509,671

SLIDE VALVE

Niels A. Christensen, South Euclid, Ohio

Application February 1, 1946, Serial No. 644,924

1 Claim. (Cl. 251—8)

This invention relates to valves and particularly to an improvement in that type of valve in which fluid entering the valve body must by-pass an obstruction in the path of flow by passing outwardly from the valve body through suitable apertures and then reentering the valve body through other apertures beyond the obstruction, the flow outside of the body being controlled by a member slidable on the body.

Valves of this general nature have heretofore been used but, as far as I am aware, have been unsatisfactory due to the difficulty of obtaining a satisfactory seal between the sliding member and the body. Such a seal is necessary to prevent leakage of fluid from the device when used in a high pressure line and to prevent by-passing it from the input to the output portions of the valve when the valve is closed.

An object of the present invention is to provide a valve, of the type referred to, which is simple in design and construction and in which the sealing means are satisfactorily effective.

Other objects and advantages of the invention will be apparent from the following description and claim and the appended drawings.

In the drawings, Fig. 1 is a longitudinal section through a valve embodying my invention; Fig. 2 is a view similar to Fig. 1 but showing the parts in a different relative position; Fig. 3 is an end elevation; Fig. 4 is a transverse section taken on the line 4—4 of Fig. 2; Fig. 5 is a longitudinal section of the sliding sleeve of the device; Fig. 6 is an end elevation of the sleeve; Fig. 7 is a longitudinal sectional view of a modified form of valve; Fig. 8 is a similar view showing the parts in different relative position; Fig. 9 is a side elevational view of the valve of Figs. 7 and 8; and Fig. 10 is a longitudinal sectional view of the sliding sleeve of the modified form.

In the embodiment illustrated in the drawings, a valve body 10 is provided with axial inlet and outlet passageways 11 and 12 respectively, and is provided at either end with appropriate means for connecting the valve in the fluid line. The connecting means may conveniently by pipe-threaded enlargements of the passageways, as illustrated at 13 and 14.

The flow of fluid is directed outwardly to, and is controlled at, the exterior of the body. To this end, a diaphragm or wall 15 is interposed between the inlet and outlet passageways and one or more radial apertures 16 are provided in the external wall of the body at the inlet side of the diaphragm and one or more radial apertures 17 are provided at the outlet side. The flow of fluid exterior of the valve body is controlled by a sliding sleeve 18 having an annular groove 19 which is of sufficient width to bridge the two sets of apertures to provide a passageway for fluid flowing from the inlet side to the outlet side of the valve, as illustrated by the arrow in Fig. 1. A balanced valve structure is thus obtained, inasmuch as the fluid exerts equal pressure to the left and to the right, as viewed in Fig. 1, upon the sleeve. The sleeve may be conveniently positioned in this right hand terminal position, as illustrated in Fig. 1, by bringing an appropriate shoulder 20 on the sleeve against a stop shoulder 21 on the valve body.

To close the valve the sleeve is slid to the left until a second shoulder 22 on the sleeve engages a second stop shoulder 23 on the body, defining a left hand terminal position, as illustrated in Fig. 2. When the sleeve is slid to this position, the groove 19 communicates with the inlet aperture 16 alone. The inlet is thus sealed off and the valve is again in a balanced condition. The shoulder 20 in this position stands inwardly of the outlet apertures 17 and the outlet side is thereby opened to the atmosphere as indicated by the arrow in Fig. 2. Where the valve is used in a compressed air line and controls the flow of air to a driven device, the pressure on the device is thus allowed to exhaust when the valve is closed. The device of Figs. 1 to 5 may thus be referred to as the open system.

In a sleeve valve of this type pressure seals are required at either side of the groove 19 to prevent leakage of the fluid between the valve and sleeve. Such seals are illustrated in the drawing at 24 and 25 as carried in grooves 24a and 25a at the inlet and outlet side of the groove 19 respectively. For these seals I prefer to use the construction set out in Letters Patent 2,180,795 entitled "Packing" and issued to me on November 21, 1939. As there shown, a toroidal ring of rubber, or similar composition, is carried in a groove whose depth is less than the diameter of the cross section of the rubber so that the cross section is compressed radially a substantial amount, and the width of the groove is slightly greater than the axial dimension of the cross section when compressed. As the sleeve slides along the valve body from one terminal position to the other the ring has a combined rolling and sliding action, accompanied by a kneading action of the material. A long-lived and effective seal is thus provided which allows easy sliding of the sleeve, even under pressure.

I have found that, with a sliding seal of whatever type it may be, trouble is experienced due to fouling of the surface of the valve body on which it slides, caused by deposits of dirt thereon. To prevent the access of dirt to these surfaces and to obtain trouble free operation of the valve, I extend the sleeve 20 to provide shrouds 26 and 27 beyond the seals 24 and 25 respectively. The inner diameter of the shrouds is only slightly greater than that of the valve body beyond the corresponding shoulders 23 and 21. As may be seen from the drawings, the length of the shrouds is greater than that of the seal-engaging region of the valve body which is exposed when the sleeve is in either terminal position, and that these regions are thus effectively protected. The device of Figs. 1 to 5 is suitable for use with gaseous pressure, and when the power stream is cut off, accomplished by moving the sleeve to the left in Fig. 2, the pressure in the delivery conduit 14 is released through ports 17, and the pressure operated device is brought to a stop as soon as the pressure is spent by escaping to the atmosphere.

To allow assembly of the valve, one of the end sections of the valve body is separably connected to the remainder of the body, as by means of screw threads 28.

In Figs. 7 to 10, I have illustrated a modified form of valve which is well adapted to control the flow of high pressure liquid. The valve body 40 in this form may in all respects be similar to that of the form just described except as to its length, and the various elements carry the same reference numerals as before. Also, the sleeve 41 is similar to that of the first form, but is modified to carry a third sealing ring 42 in a groove 42a. In addition, a groove 43, corresponding to that at 19 is provided, whereby symmetry and resulting ease and simplicity in assembly are obtained.

When the sleeve 41 is in the right hand position, as illustrated in Fig. 7, communication is afforded between the input and the output sides of the valve, as indicated by the arrow. When the sleeve is in the off or left hand position, indicated in Fig. 8, the second seal 25 stands midway between the two sets of apertures communicating with the inlet and outlet passageways respectively, while the first and third seals stand beyond the respective sets of apertures. Thus in this form of valve both the inlet and outlet are sealed off when the valve is closed. It will be seen that, for this reason, either end of the valve may be connected to the inlet line, and that leakage of fluid from the outlet line is prevented. Except for the seal 42 and groove 42a, and the optional groove 43, the sleeve 41 may be in all respects similar to the sleeve 18 in the first form of valve, and the various elements carry the same reference numerals as there shown and perform the same functions. The device of Figs. 6 to 10 may be referred to as a closed system.

Referring to Fig. 9, it will be seen that the valves of both the first and second forms present a pleasing appearance to the eye and need be only slightly larger in diameter than the line to which they are connected.

While I have illustrated specific embodiments of my invention, it will be apparent that numerous changes and modifications may be made within its spirit and scope.

I claim:

A balanced valve comprising a separable elongated body having a cylindrical wall, outlet and inlet passageways in the body, a partition in said passageway and axially spaced inlet and outlet apertures in the cylindrical wall on opposite sides of said partition leading to the respective passageways, an integral sleeve axially slidable on a cylindrical wall, stops on the body defining two terminal positions of said sleeve, an annular groove in the sleeve communicating with the apertures when the sleeve is in one terminal position, annular seals carried by the sleeve at either side of the groove and engaging the cylindrical wall at opposite sides of the apertures when in said one position, said seals comprising toroidal rings seated in inwardly facing grooves having a depth less than the diameter of the cross section of the ring seal and a width greater than the axial dimension of the cross section of said seal when compressed, one of the seals being adapted to engage the cylindrical wall between the apertures when the sleeve is in another of its terminal positions whereby to seal off the inlet passageway, said seals being so arranged that leakage of fluid around the seals when fluid is flowing in either direction through the passageways, is prevented, and extended shrouds on opposite ends of the sleeve beyond the seals to prevent fouling of the sections of the cylindrical wall engaged by the seals, said shrouds being of a length greater than the exposed seal-engaging portion of the valve body in either of its terminal positions.

NIELS A. CHRISTENSEN.

REFERENCES CITED

The following references are of record in the file of this patent:

UNITED STATES PATENTS

| Number | Name | Date |
| --- | --- | --- |
| 970,225 | Holden | Sept. 13, 1910 |
| 1,944,739 | Hunt | Jan. 23, 1934 |
| 2,071,204 | Hunt | Feb. 16, 1937 |
| 2,178,828 | Broecker | Nov. 7, 1939 |
| 2,180,795 | Christensen | Nov. 21, 1939 |
| 2,445,505 | Ashton | July 20, 1948 |